(12) United States Patent
Schut et al.

(10) Patent No.: US 6,376,058 B1
(45) Date of Patent: *Apr. 23, 2002

(54) POLYPROPYLENE BASED COMPOSITIONS AND FILMS AND LABELS FORMED THEREFROM

(75) Inventors: Johannes Schut, Alphen aan den Rijn; Coen van Tol, Mijdrecht, both of (NL); Mitchell J. Rackovan, Madison, OH (US); Paul C. McCaslin, Claremont; Eng-Pi Chang, Arcadia, both of CA (US)

(73) Assignee: Avery Dennison Corporation, Pasadena, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/470,194

(22) Filed: Dec. 21, 1999

(51) Int. Cl.[7] .......................... C08L 23/12; B32B 27/32
(52) U.S. Cl. ...................... 428/220; 428/41.3; 428/910; 525/227
(58) Field of Search .................. 525/227; 428/220, 428/910, 41.3

(56) References Cited

U.S. PATENT DOCUMENTS

| | | | |
|---|---|---|---|
| 4,362,844 A | 12/1982 | Lemstra et al. | 525/57 |
| 4,713,273 A | 12/1987 | Freedman | 428/40 |
| 5,186,782 A | 2/1993 | Freedman | 156/244.11 |
| 5,242,650 A | 9/1993 | Rackovan et al. | 264/509 |
| 5,272,210 A | * 12/1993 | Galante | |
| 5,288,548 A | 2/1994 | Weber | 428/315.9 |
| 5,451,283 A | 9/1995 | Josephy et al. | 156/229 |
| 5,464,687 A | * 11/1995 | Sheth | |
| 5,516,393 A | 5/1996 | Freedman | 156/229 |

FOREIGN PATENT DOCUMENTS

| | | | |
|---|---|---|---|
| GB | 902809 | * | 8/1962 |
| JP | 51-011840 | * | 1/1976 |
| JP | 58-053934 | * | 3/1983 |

OTHER PUBLICATIONS

Encyclopedia of Polymer Science vol. 7 pp. 80,81,96–102, 1983.*

Concise Encyclopedia of Polymer Science, Kroschwitz pp. 16–17, Oct. 1990.*

* cited by examiner

*Primary Examiner*—David J. Buttner
(74) *Attorney, Agent, or Firm*—Renner, Otto, Boisselle & Sklar, LLP

(57) ABSTRACT

A polypropylene based composition is described which comprises a mixture of (A) a propylene polymer or copolymer and (B) an alkylene-alkyl acrylate copolymer. These polypropylene based compositions are useful in the preparation of continuous films such as by extrusion, and the films can be oriented by stretching in the machine direction. The films prepared from the polypropylene compositions of this invention exhibit a variety of useful properties including the desired printability, stiffness, and die-cuttability to be useful as a facestock in preparing labels. Films prepared from the polypropylene based compositions of the invention also can be used as a base film, and the films can be overlaminated with a functional film. Machine-direction oriented monolayer and multilayer film facestocks for labels, and adhesive containing film labelstock for use in adhesive labels also are described. The present invention, in one embodiment, relates to the discovery that the films of the polypropylene compositions are useful as the facestocks in label applications. The clear films prepared from the polypropylene compositions of the invention also are useful for laminating over other polymer films and film facestocks to provide improved printability, die-cuttability and/or scuff resistance characteristics to the polymer films and facestocks.

33 Claims, 1 Drawing Sheet

POLYPROPYLENE BASED COMPOSITIONS AND FILMS AND LABELS FORMED THEREFROM

FIELD OF THE INVENTION

This invention relates to polypropylene based compositions, films, and labels prepared from such films. More particularly, the invention relates to polypropylene based compositions comprising a mixture of a propylene polymer or copolymer and an alkylene alkyl acrylate copolymer, and films and labels prepared therefrom that are ink printable die-cuttable and/or scuff resistant.

BACKGROUND OF THE INVENTION

It has long been known to manufacture and distribute pressure-sensitive adhesive stock for labels by providing a layer of face or facestock material for the label or sign backed by a layer of pressure-sensitive adhesive which in turn is covered by a release liner or carrier. The liner or carrier protects the adhesive during shipment and storage and allows for efficient handling of an array of individual labels after the labels are die-cut and the matrix (waste) is stripped from the layer of facestock material up to the point where the individual labels are dispensed in sequence on a labeling line. A typical method of die cutting uses a steel die blade. During the time from die-cutting to dispensing, the liner or carrier remains uncut and may be rolled and unrolled for storage, transit and deployment of the array of individual labels carried thereon.

Failure to reliably dispense is typically characterized by the label following the carrier around a peel plate without dispensing or "standing-off" from the carrier for application to the substrate. Such failure to dispense is believed to be associated with excessive release values between the label facestock material and the liner. Dispensibility also is dependent upon the stiffness of the facestock. Failure to dispense may also be characterized by the wrinkling of the label due to lack of label stiffness at the dispensing speed as it is transferred from the carrier to the substrate. Another particular need in many labeling applications is the ability to apply polymeric-film labels at high line speeds, since an increase in line speed has obvious cost saving advantages.

In many label applications, it is desirable that the facestock material be a film of polymeric material which can provide properties lacking in paper, such as clarity, durability, strength, water-resistance, abrasion-resistance, gloss and other properties. Historically, polymeric facestock material of thicknesses greater than about 3 mils (75 microns) have been used in order to assure dispensability in automatic labeling apparatuses. For example, plasticized polyvinyl chloride films about 3.5 to 4.0 mils (87.5 to 100 microns) thick were used in label application because these films exhibited the desired flexibility characteristics. However, the migration of the plasticizers used in PVC films to convert the normally rigid films to flexible films was recognized as a major problem area for these types of films resulting in loss of desirable properties such as adhesion and flexibility, as well as other problems such as ink anchorage failure, color buildup, and shrinkage. Eventually, migration of the plasticizer results in wrinkling, cracking and visual deterioration of the facestock and/or label. Also, it is desirable to reduce the thickness or "down-gauge" the facestock material in order to attain savings in material costs. Such reduction in facestock thickness often has resulted in reduced stiffness and the inability to die-cut and dispense the labels in a reliable commercially acceptable manner using automatic machinery. There also was pressure for environmental reasons to prepare labels from facestock polymers other than polyvinyl chloride.

Polymeric materials suggested in the prior art as useful in preparing labels include biaxially-oriented polypropylene ("BOPP") of thicknesses down to about 2.0 mils (50 microns). These materials provide cost savings as they are relatively inexpensive, and they have sufficient stiffness to dispense well. However, these materials also have relatively high tensile modulus values in both machine-direction (MD) and cross direction (CD) which results in unacceptable conformability characteristics. When biaxially-oriented films are applied to rigid substrates such as glass bottles, the application is not completely successful. The relatively stiff labels have a tendency to bridge surface depressions and the mold seams resulting from bottle-forming processes resulting in an undesirable surface appearance of the applied label simulating trapped air bubbles. This has somewhat impeded the use of pressure-sensitive adhesive labels to replace prior glass bottle labeling techniques such as ceramic ink directly bonded to the bottle surface during glass bottle manufacturing processes as customers find the appearance unattractive. Such ceramic ink techniques are environmentally undesirable due to objectionable ink components which contaminate crushed bottle glass in recycling processes. Attempts to use the relatively stiff oriented polypropylene films on flexible substrates such as plastic bottles also have not been completely successful because the labels do not have the flexibility required to conform to the flexible plastic containers. Oriented polypropylene films are also more difficult to print than PVC or polyethylene films.

Other useful materials are unoriented polyethylene and polypropylene films that are also relatively inexpensive and conformable. However, both of these films are difficult to die-cut and do not dispense well at low calipers. In Europe, an unoriented, relatively thick polyethylene facestock has been used successfully in preparing labels. The facestock is die-cuttable and the labels can be dispensed in high speed automatic dispensing equipment. The normal thickness of this "standard" polyethylene facestock in Europe is about 4.0 mils (100 microns). Attempts to reduce the gauge of the polyethylene facestock to reduce costs has not yet met with significant success because the thinner polyethylene facestock is not readily die-cuttable with the die leaving a mark on the liner, stringers on the cut label, and/or hangers between the labels. A stringer (also called ticker) is a small thread of material between the label and the matrix after die cutting. Thus, the label and matrix are still connected by a small string of material. A stringer occurs when the label is not clean cut, and it can cause the label to be removed with the matrix. A hanger occurs when a segment of the CD matrix breaks during CD matrix stripping. Additionally, the thinner facestock becomes difficult to dispense at higher speeds over a peel plate because of reduced stiffness.

Since labels are intended to carry information, the printability of especially filmic PSA labels is very important. Printability is defined by the sharpness and brightness of the image and by the ink anchorage. The sharpness is closely related to the surface tension of the print surface. The ink anchorage is often tested by a tape test (Finat test: FTM21). In general PVC is printable with a variety of inks intended to be used with PVC. For polyolefin films there is another range of printing inks in most occasions the inks are water-based (especially in the US) or designed for UV drying (especially in Europe). In general all polyolefin films can be printed with UV inks after on-press corona treatment, PE being better than PP mainly on ink adhesion. For waterbased inks an additional primer or topcoat is needed to get good ink anchorage.

SUMMARY OF THE INVENTION

A polypropylene composition is described which comprises a mixture of (A) a propylene polymer or copolymer and (B) an alkylene-alkyl acrylate copolymer. These polypropylene compositions are useful in the preparation of continuous films such as by extrusion, and the films can be oriented by stretching in the machine direction. The films prepared from the polypropylene compositions of this invention exhibit a variety of useful properties including the desired stiffness, flexibility, printability (both waterbased and UV inks), abrasion resistance and/or die-cuttability to be useful as a facestock in preparing labels. Films prepared from the polypropylene composition also can be used as a base film, and the films can be overlaminated or coextruded with a functional film when specific properties are desired. Machine-direction oriented monolayer and multilayer film facestocks for labels, and adhesive containing film labelstock for use in adhesive labels also are described.

The present invention, in one embodiment, relates to the discovery that the films of the polypropylene compositions are useful as the facestocks in label applications, and in particular, in label applications such as on plastic bottles containing personal care products (e.g., shampoo). The clear films prepared from the polypropylene compositions of the invention also are useful for laminating over other polymer films and film facestocks to provide desirable characteristics to the polymer films and facestocks.

DESCRIPTION OF THE PREFERRED EMBODIMENTS

Figure 1:
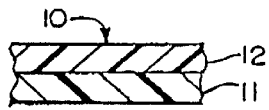
FIG. 1 is a schematic illustration of a cross sectioned side elevational view of a multilayer film embodying one embodiment of the present invention.

A first component of the compositions of the invention is a propylene homopolymer or copolymer, or a blend of a propylene homopolymer and at least one propylene copolymer. When blends of homopolymers and copolymers are used, the blends may comprise from about 5% to about 95% of the homopolymer and correspondingly from about 95% to about 5% by weight of the copolymer. The propylene homopolymers which may be utilized either alone or in combination with a propylene copolymer as described herein, include a variety of propylene homopolymers such as those having melt flow rates (MFR) from about 1 to about 30, preferably from about 1 to about 20, and more often from about 6 to about 14, as determined by ASTM Test D1 238, condition L. Propylene homopolymers having MFRs of from about 6 (preferably at least about 8) to about 12 are particularly useful and provide films having improved die-cuttability. Useful propylene homopolymers also may be characterized as having densities in the range of about 0.88 to about 0.92 g/cm$^3$ and a flexural modulus of at least 1000 MPa.

A number of useful propylene homopolymers are available commercially from a variety of sources. Some of the homopolymers are listed and described in the following Table I.

TABLE I

Commercial Propylene Homopolymers

| Commercial Designation | Company | Melt Flow Rate (g/10 min) | Density (g/cm$^3$) |
| --- | --- | --- | --- |
| WRD5-1057 | Union Carbide | 12.0 | 0.90 |
| DX5E66 | Union Carbide | 8.8 | 0.90 |
| 5A97 | Union Carbide | 3.9 | 0.90 |
| Z9470 | Fina | 5.0 | 0.89 |
| Z9470HB | Fina | 5.0 | 0.89 |
| Z9550 | Fina | 10.0 | 0.89 |
| 6671XBB | Fina | 11.0 | 0.89 |
| 3576X | Fina | 9.0 | 0.89 |
| 3272 | Fina | 1.8 | 0.89 |
| SF6100 | Montell | 11.0 | 0.90 |
| Profax 6323 | Montell | 12.0 | 0.90 |
| Stamylan P 17M10 | DSM | 10.0 | 0.90 |
| Stamylan P 17U10 | DSM | 3.0 | 0.90 |

The propylene copolymers which may be utilized in the compositions of the invention generally comprise copolymers of propylene and up to about 40% by weight of at least one alpha-olefin selected from ethylene and alpha-olefins containing from 4 to about 8 carbon atoms. Examples of useful alpha-olefins include ethylene, 1-butene, 1-pentene, 4-methyl-1-pentene, 1-hexene, 1-heptene, and 1-octene. More often, the copolymers of propylene which are utilized in the present invention comprise copolymers of propylene with ethylene, 1-butene or 1-octene. The propylene alpha-olefin copolymers useful in the present invention include random as well as block copolymers although the random copolymers generally are preferred. Blends of the copolymers as well as blends of the copolymers with propylene homopolymers can be utilized as the composition for the base layer. In one preferred embodiment, the propylene copolymers are propylene-ethylene copolymers with ethylenic contents of from about 0.2% to about 10% by weight. Preferably, the ethylene content is from about 3% to about 10% by weight and more preferably from about 3% to about 6% by weight. With regard to the propylene-1-butene copolymers, 1-butene contents of up to about 15% by weight are useful. In one embodiment, the 1-butene content generally may range from about 3% by weight up to about 15% by weight, and in other embodiments, the range may be from about 5% to about 15% by weight. Propylene-1-octene copolymers useful in the present invention may contain up to about 40% by weight of 1-octene. More often, the propylene-1-octene copolymers will contain up to about 20% by weight of 1-octene.

The propylene copolymers useful in preparing the compositions of the present invention may be prepared by techniques well known to those skilled in the art, and many such copolymers are available commercially. For example, the copolymers useful in the present invention may be obtained by copolymerization of propylene with an alpha-olefin such as ethylene or 1-butene using single-site metallocene catalysts. A list of some useful commercially available propylene copolymers is found in the following Table II. The propylene copolymers useful in the invention have an MFR of from about 1 to about 30, preferably from about 1 to about 20, and more often from about 6 to about 14. Improved die-cuttability is obtained when the propylene copolymers have MFRs in the range of about 6 to about 12.

TABLE II

Commercial Propylene Copolymers

| Commercial Name | Source | % Ethylene | % 1-Butene | Melt Flow Rate (g/10 mins) | Density (g/cm³) |
|---|---|---|---|---|---|
| DS4D05 | Union Carbide | — | 14 | 6.5 | 0.890 |
| DS6D20 | Union Carbide | 3.2 | — | 1.9 | 0.890 |
| DS6D81 | Union Carbide | 5.5 | — | 5.0 | NA |
| SRD4-127 | Union Carbide | — | 8 | 8.0 | NA |
| SRD4-104 | Union Carbide | — | 11 | 5.0 | NA |
| SRD4-105 | Union Carbide | — | 14 | 5.0 | NA |

A second component of the compositions of the invention is an alkylene-alkyl acrylate copolymer. In one embodiment, the alkylene alkyl acrylate copolymer viscosity is chosen to be similar to the viscosity of the propylene polymer at the extrusion temperatures (e.g., 190° C., 210° C. and 230° C.) and the extrusion shear rate conditions (0.1 to 1000s$^{-1}$). In order to avoid phase separation, in one embodiment the viscosity of the disperse phase should be equal to or preferably not more than a factor of about 4 times higher than the viscosity of the continuous phase. The alkylenes are alpha olefins containing from 2 to about 8 carbon atoms such as ethylene, propylene, 1-butene, 1-pentene, 1-hexene, 1-heptene, 1-octene, 4-methyl-1-pentene, etc. More often, the alkylene is ethylene or propylene, and most often, ethylene.

The alkyl acrylates generally are C-1 to C-8 alkyl acrylates or methacrylates, and more often, a C-1 to C-8 alkyl acrylate. For example, the acrylates may include ethyl acrylate, n-butyl acrylate, hexyl acrylate, octyl acrylate, etc. Alternatively, the acrylate may be C-1 to C-8 alkyl methacrylate such as, for example, methyl methacrylate, ethyl methacrylate, propyl methacrylate, n-butyl methacrylate, hexyl methacrylate, etc.

The alkylene-alkyl acrylate copolymers are prepared by polymerizing mixtures of an alpha olefin and the alkyl acrylate by techniques well known to those skilled in the art. In general, the acrylate content or methacrylate content of the copolymer may be from about 5 to about 30% by weight, and the olefin content of the copolymer may be from about 70 to about 95% by weight. More often, the copolymers will contain from about 15 to about 20% by weight of the acrylate.

Commercially available examples of useful acrylates include ethylene-methyl acrylate copolymer available from Chevron Chemical Company as PE 2205 (methyl acrylate content of 20% by weight and a melt index of 2.4); ethylene-n-butyl acrylates available from Atochem under the designation Lotryl such as Lotryl 17BA04 (containing 16 to 19% by weight of acrylic ester and having a melt flow rate of 3.5 to 4.5 dg/min at 190° C. and 9.8 dg/min at 230° C.); Lotryl 17BA07 having an acrylic ester content of 16 to 19% by weight and a melt flow rate of 6.5 to about 8; and Lotryl 7BA01 having an acrylic ester content of 6 to 8% by weight and a melt flow rate of from 1 to 1.5.

In one embodiment, the propylene based compositions of the present invention generally will comprise from about 25% to about 95% by weight, of (A) a propylene homopolymer or copolymer, and from about 5% to about 75% by weight, of (B) an alkylene alkyl acrylate copolymer as described above. In other embodiments, the compositions may comprise 40–95% by weight or 50–80% by weight of the propylene polymer or copolymer, and 5–60% by weight or 20–50% by weight of the acrylate copolymer. In one embodiment, blends containing from about 50% to 80% by weight of A and from about 20% to 50% by weight of (B) are used when films formed from the blends are to be die-cut into labels by, for example, using a steel blade. Films prepared from blends of the propylene polymer or copolymer and the acrylate copolymer are transparent unless filler is added. In one embodiment the transparency of the films without filler increases somewhat as the concentration of the propylene in the blend increases and the concentration of the acylate copolymer decreases.

The compositions comprise blends of the two components which can be combined into a uniform mixture by melt blending in conventional equipment such as a Bandbury mill, extruder, or the like. Alternatively, the blends may be made by solution blending, or by dry mixing the two components followed by melt fabrication of the dry mixture by extrusion.

The propylene compositions of the present invention may contain other additives to modify the properties of the composition. For example, colorants and mineral fillers may be included in the composition such as $TiO_2$, $CaCO_3$, talc, silica, mica, etc. The presence of small amounts of $TiO_2$, for example, results in an opaque or white composition. Mineral fillers can be included in the propylene compositions in amounts of from about 1 to about 40% by weight, more often from about 5 to about 40% by weight. Other additives which may be included in the propylene compositions of the present invention include metal particles, fibers, flame retardants, antioxidants, heat stabilizers, light stabilizers, ultraviolet light stabilizers, antiblocking agents, processing aids, etc. LD 0011 as a white pigment masterbatch containing 25% of low density polyethylene, 25% calcium carbonate and 50% titanium dioxide. These materials are available from Ferro. Another useful pigment masterbatch comprises titanium dioxide dispersed in low density polyethylene. When a low density polyethylene matrix loaded with $TiO_2$ (e.g., from about 20% to 70% $TiO_2$) is added to the polymer blends, no "dusting" problem is seen, and this is a significant advantage. At the extrusion temperatures, the polyethylene matrix is in a sticky molten state and appears to bind the $TiO_2$, preventing the $TiO_2$ from coming to the surface to cause dusting. In one embodiment of the white formulations, a certain percentage of the acrylate copolymer (e.g., 10 to 25% w) is replaced by the polyethylene/$TiO_2$ mixture to provide the desired opacity. An exemplary blend comprises 50% w of propylene polymer, 34% w of the acrylate copolymer and 16% of the polyethylene/$Tio_2$ mixture.

Since two or more contacting layers of some of the films prepared from the propylene composition of the invention may have a tendency to stick together or "block" (e.g., when the film is wound into a roll), antiblocking agents may be added to the propylene compositions. Antiblocking agents are generally inorganic mineral fillers that reduce "sticking" by reducing the intimate contact between film layers. Antiblocking agents which may be included in the propylene compositions of the invention include mineral fillers such as diatomaceous earth, talc, calcium carbonate, silica and synthetic silica. Diatomaceous earth and talc are the two most commonly used antiblocking agents. An example of a useful commercial antiblocking agent is CB070 which is available from Ferro and is a masterbatch comprising 30% LDPE and 70% talc. In one embodiment, the filler or pigment is dispersed in the propylene polymer or copolymer (A), or in another polyolefin base material with a lower melting point than (A), and the pigment containing polymer is then blended with the alkylene-alkyl acrylate copolymers.

In some embodiments of the invention, the blends of the propylene polymer or copolymer and alkylene alkyl acrylate copolymer may also contain one or more compatibilizers. In one embodiment, a compatibilizer may comprise a polyolefin copolymerized with or grafted to a polar reactant. For example, the compatibilizer may be an acrylic acid modified polypropylene graft copolymer (e.g., Polybond® 1003, BP chemicals), or a maleated polypropylene graft copolymer (e.g., Polybond® 3001 from BP Chemicals). In general, these compatibilizers may be referred to as carboxylated or maleated polyolefins.

The following examples in Table IIA illustrate the polypropylene compositions of the present invention. Unless otherwise indicated in the following examples, in the claims and elsewhere in the written description, all parts and percentages are by weight, temperatures are in degrees centigrade, and pressures are at or near atmospheric pressure.

TABLE IIA

Exemplary Film Compositions

| | % w |
|---|---|
| Composition 1 | |
| Stamylan 17M10 | 60 |
| Lotryl 17BA04 | 40 |
| Composition 2 | |
| Stamylan P 17M10 | 50 |
| Lotryl 17BA04 | 50 |
| Composition 3 | |
| Stamylan P 17M10 | 70 |
| Lotryl 17BA04 | 30 |
| Composition 4 | |
| Stamylan P 17M10 | 50 |
| Lotryl 17BA07 | 50 |
| Composition 5 | |
| Stamylan P 17M10 | 70 |
| Lotryl 17BA07 | 30 |
| Composition 6 | |
| Stamylan P 17M10 | 65 |
| Lotryl 17BA04 | 35 |
| Composition 7 | |
| Stamylan P 17M10 | 65 |
| Lotryl 17BA07 | 35 |

TABLE IIA-continued

Exemplary Film Compositions

| | % w |
|---|---|
| Composition 8 | |
| Stamylan P 17M10 | 50.0 |
| Lotryl 17BA04 | 40.7 |
| Ferro LD0011 | 9.3 |
| Composition 9 | |
| Stamylan P 17M10 | 70.0 |
| Lotryl 17BA04 | 15.3 |
| Ferro LD0011 | 14.7 |
| Composition 10 | |
| Stamylan P 17M10 | 50.0 |
| Lotryl 17BA04 | 35.3 |
| Ferro LD0011 | 14.7 |
| Composition 11 | |
| Stamylan P 17M10 | 70.0 |
| Lotryl 17BA04 | 20.7 |
| Ferro LD0011 | 9.3 |
| Composition 12 | |
| Appryl 3100 YN1 | 70 |
| Lotryl 17BA04 | 30 |
| Composition 13 | |
| Stamylan P 17M10 | 80 |
| Lotryl 17BA04 | 20 |
| Composition 14 | |
| Stamylan P 17M10 | 85 |
| Lotryl 17BA04 | 15 |
| Composition 15 | |
| Stamylan P 17M10 | 75 |
| Lotryl 17BA04 | 25 |
| Composition 16 | |
| Stamylan P 17M10 | 25 |
| Lotryl 17BA04 | 75 |
| Composition 17 | |
| Stamylan P 17M10 | 10 |
| Lotryl 17BA04 | 90 |
| Composition 18 | |
| Stamylan P 17M10 | 90 |
| Lotryl 17BA04 | 10 |

The polypropylene compositions of the invention are thermoplastic compositions and are suitable for extrusion, blow molding, and in the preparation of various articles such as molded parts, extruded shapes, tubing, films, sheets, laminates, etc. Foams can be made from the propylene compositions of the present invention by incorporating a blowing agent and other well known additives such as particulate nucleating agents, and thereafter extruding the composition.

The propylene compositions of the present invention are particularly useful in preparing continuous films which have desirable characteristics, particularly for label applications. The films are prepared by extrusion techniques well known to those skilled in the art, and the films may range in thickness from about 0.5 to about 3, 4 or 5 mils. More often, the films will have a thickness of from about 2 to about 4 mils, and most often from about 2.5 to about 3.6 mils.

In one embodiment, it is preferred that the films prepared from the polypropylene compositions of the invention are oriented in the machine direction. For example, the films may be hot-stretched in the machine direction at a ratio of at least 2:1. More often, the film will be hot stretched at a stretch ratio of between 2:1 and 9:1. After the film has been hot stretched, it is generally passed over annealing rolls where the film is annealed or heat-set at temperatures in the range of from about 50°, more often 100° C. to about 150° C., followed by cooling. Such orientation provides the films with improved properties such as an increase in the stiffness of the film and in some instances, improved printability. For example, extruded film samples comprising 75% w of polypropylene (PP) and 25% of an ethylene n-butyl acrylate copolymer (EBA) which have been oriented in the machine direction at a ratio of 8:1 and 9:1 are found to have enhanced printability when compared to a film stretched at a ratio of 7:1. Although not wishing to be bound by any theory, it appears, based on atomic force microscopy (AFM), that the stretching causes changes in the surface polymer distribution and effective surface area resulting in enhanced printability. In particular, it appears that there is an increased presence of the EBA copolymer phase at the surface and increased surface area caused by the polymer fiber separation at the higher stretching ratio. It also has been observed that stretching temperature also has an effect on printability. Lower stretching temperatures appear to produce a film having enhanced printability. The machine direction tensile modulus of the film also is increased by the stretching step, contributing to dimensional stability and good print registration. It also has been observed that the orientation in machine direction improves the die-cuttability of the films, and the dispensability of labels formed from the films. In some embodiments, abrasion or scuff resistance also is improved.

The films of the present invention may be monolayer films of the polypropylene compositions of the present invention as described above. Alternatively, the films of the invention may be multilayer films wherein at least one of the layers is a continuous film of the polypropylene compositions of the present invention. Functional layers of polymeric films may be on one or both sides of the polypropylene film. A functional layer or film is defined as one which is included to provide certain properties such as weatherability, printability, barrier layer, antistatic, etc. Such multilayer films may be prepared by coextrusion of two or more layers; by extrusion of a continuous film of the polypropylene compositions of the present invention followed by the application of one or more additional layers on the extruded film by extrusion of one or more additional layers; by lamination of a preformed polypropylene film of the invention to a preformed functional film; or by deposition of additional layers on the polypropylene film from an emulsion or solution of a polymeric film forming material.

A functional film or layer is included in the multilayer constructions of the invention to provide the propylene film with additional and/or improved properties such as printability, die-cuttability, weatherability, stiffness, abrasion resistance, etc. For example a transparent coating or film can be extruded on or laminated over printed indicia on the polypropylene film to protect the print from damage caused by physical contact with adjacent objects, and damage caused by exposure to moisture, water or weather. The transparent coating can also enhance the optical qualities of the underlying printed indicia to provide a glossier and richer image. A functional film also can be included to improve the adhesion of the polypropylene film to a substrate.

The added functional films are generally thin relative to the thickness of the polypropylene film, but thicker functional layers are also useful in some applications. The functional films are often referred to as skin layers, particularly when they are thinner than the polypropylene film. Alternatively, the polypropylene film of the invention can be used as a skin layer over a thicker base film (may be a multilayer film). The polypropylene skin layer can be coextruded with the base film or laminated onto a preformed base film.

A wide variety of thermoplastic polymers can be utilized to form the functional films, and the particular thermoplastic polymer chosen is one which will provide the desired properties to the structure. Examples of useful materials include polystyrenes, polyethylene, polyamides, polyesters, polycarbonates, polyurethanes, polyacrylates, polyvinyl alcohol, poly(ethylene vinyl alcohol), polyvinyl acetates, ionomers, and mixtures thereof. Ethylene vinyl acetate copolymers are particularly useful for printable cover layers.

Figure 2:
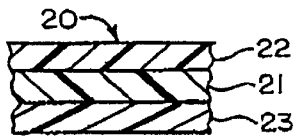
FIG. 2 is a schematic illustration of a cross sectioned side elevational view of a multilayer film embodying another embodiment of the present invention.

Examples of the multilayer films of the present invention are illustrated in FIGS. 1 and 2. In FIG. 1, a multilayer construction in accordance with the present invention, generally indicated by reference numeral 10 comprises a polypropylene film layer 12 and a functional film or base layer 11. This two layer structure exhibits desirable characteristics at the exposed surface of film 12 and may be prepared by either coextrusion or by separate formation and lamination of the two layers together without an adhesive. In this latter embodiment, the polypropylene film layer 12 or the functional layer 11, or both, are formed from a material that is heat activatable to provide its own adhesive surface for lamination. The material should have a sufficient "open tack" time to facilitate lamination at a relatively low temperature so as to avoid unwanted heat effects in the adhesive constructions. "Open tack" refers to the amount of time that the just activated film material remains tacky or open to adhesive contact with an adjacent surface. Alternatively (not shown in FIG. 1), the polypropylene film 12 can be laminated to the functional film 11 with an adhesive.

FIG. 2 illustrates, in one embodiment, another multilayer construction of the present invention generally represented by the numeral 20 wherein the polypropylene film layer 21 is between two functional layers 22 and 23. The functional layers 22 and 23 may comprise the same or different polymer material. Again, the construction illustrated in FIG. 2 can be prepared by coextrusion of three separate streams of polymeric film-forming material by techniques well known to those skilled in the art, or the construction 20 in FIG. 2 can be prepared by laminating the two functional cover layers 22 and 23 to the polypropylene film 21. In another embodiment as illustrated in FIG. 2, layer 22 is a film of the polypropylene composition of the invention, and layers 21 and 23 are functional layers.

Figure 3A:
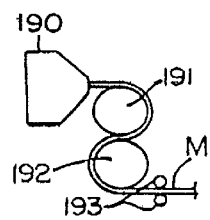
FIGS. 3A, 3B and 3C are schematic illustrations showing a process for making monolayer or multilayer films of the present invention.

As noted above, the monolayer and multilayer films of the present invention are, in one embodiment, oriented in the machine direction. The extruded monolayer or multilayer films which are machine-direction oriented may be prepared by the general procedure described and illustrated in FIGS. 3A–3C by extruding or coextruding charges of the film-forming resins for the layer or layers of the film to form an extrudate. Although FIG. 3A illustrates extrusion through cast film extrusion (i.e., through flat dies), the charge or charges for one or more layers can be extruded or coextruded in a known manner by blown film extrusion (i.e., by extrusion through circular dies) followed by passing of the blown stock between rolls. When the film which is extruded comprises two or more layers, two or more polymer film-forming materials are charged to the extrusion die 190.

With respect to one embodiment, the charge or charges may be prepared for extrusion or coextrusion through an extrusion die 190 and flat film casting, as schematically illustrated in FIG. 3A. The extruded film is cast on a first cooling roll 191, continues around a second cooling roll 192, and is advanced by pull-off rolls 193. The second cooling roll is not always required.

Figure 3B:
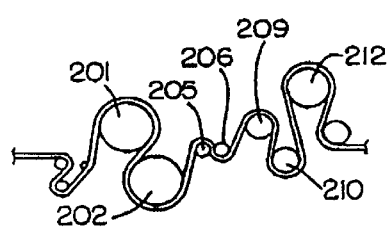
Figure 3C:

As mentioned above, stiffness of the film is important to proper dispensing of labels at higher line speeds. FIG. 3B illustrates a hot-stretching station at which the stiffness of the flat stock M is increased in the machine-direction by orienting the film in the machine direction at a stretch ratio of at least about 2:1, more often at a stretch ratio of between 2:1 to 9:1. The MD tensile modulus of the film is also increased by the stretching step, contributing to dimensional stability and good print registration. After passing around a pair of pre-heat rolls 201 and 202 which soften the stock, the softened stock is then stretched between the orientation roll pair 205 and 206, the latter rotating at a multiple of the speed of the pre-heat rolls, corresponding to the stretch ratio, say 5 to 1. The stock then passes over the annealing rolls 209 and 210 at which it is annealed or heat-set, and finally the stock passes over the chill roll 212 to complete the hot-stretch operation. The stock may then be taken up in roll form as seen in FIG. 3C.

The stiffness of the machine-direction-oriented multilayer film prepared by the general procedure described above as determined on an L+W Bending Resistance Tester (Test Method: ISO 2493) should be at least about 15 or 20 mN in the machine-direction for high speed dispensing over a peel plate. In one preferred embodiment, the multilayer film is characterized as having an L+W stiffness in the machine-direction greater than about 35 mN. For some wide label and/or high speed dispensing and labeling applications, an L+W stiffness of from about 50 mN to about 100 mN is preferred. The stiffness in the cross-direction should be substantially less than the stiffness in the machine-direction. In one embodiment, the L+W value in the cross-direction is less than 0.75 times the value in the machine-direction. In general the relationship between L+W stiffness in mN to Gurley stiffness as measured by TAPPI T543 PM-84 is as follows: L+W=1.75×Gurley.

The films which can be prepared from the polypropylene compositions of the present invention are useful, particularly, in the preparation of facestock and subsequently labelstock for use in preparing adhesive labels. Labelstock generally comprises the film facestock (which may be monolayer or multilayer) and an adhesive layer. The adhesive layer generally is in contact with and adhesively joined to one surface of the polypropylene films of the present invention. When the films of the present invention are multilayer films such as illustrated in FIGS. 1 and 2, the adhesive layer generally is in contact with and adhesively joined to the lower surface of the functional film layer 11 in FIG. 1, and to the outer or skin layer 23 of film 20 in FIG. 2.

Figure 4A:
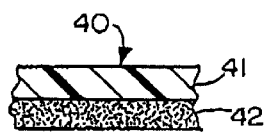
FIG. 4A is a schematic illustration of a cross sectioned side elevation view of a label stock embodying one embodiment of the invention.

FIG. 4A illustrates one embodiment of the present invention which relates to a labelstock for use in preparing adhesive labels. The labelstock which is generally referred to by the numeral 40 comprises a monolayer 41 of the polypropylene film of the present invention and an adhesive layer 42 which is adhesively joined to the lower surface of the polypropylene film 41.

Figure 4B:
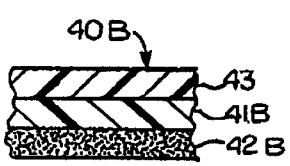
FIG. 4B is a schematic illustration of a cross sectioned side elevational view of a multilayer label stock embodying one embodiment of the invention.

FIG. 4B illustrates another embodiment of the present invention which is a multilayer labelstock generally referred to by the numeral 40B. In one embodiment, the labelstock comprises a polypropylene film 41B in accordance with the present invention having an upper surface and a lower surface, an adhesive layer 42B adhesively joined to the lower surface of the polypropylene film 41B, and a functional cover layer 43 joined to the upper surface of the polypropylene film 41B.

In another embodiment of FIG. 4B, layer 41B is a functional layer as described above, layer 43 is a layer of the polypropylene film of the invention, and layer 42B is an adhesive.

In yet a further embodiment, not illustrated in any of the figures, a labelstock can be prepared from the film illustrated in FIG. 2 by adding an adhesive layer which is in contact with the lower surface of layer 23 of the multilayer film 20.

The adhesive layer utilized in the labelstocks of the present invention such as illustrated in FIGS. 4A and 4B may be directly coated on the lower surface of the indicated layers, or the adhesive may be transferred from a liner with which the facestock is combined. Typically, the adhesive layer has a thickness of from about 0.4 to about 1.6 mils (10 to about 40 microns). Adhesives suitable for use in labelstocks of the present invention are commonly available in the art. Generally, these adhesives include pressure-sensitive adhesives, heat-activated adhesives, hot melt adhesives, etc. Pressure-sensitive adhesives (PSAs) are particulary preferred. These include acrylic based adhesives as well as other elastomers such as natural rubber or synthetic rubber containing polymers or copolymers of styrene, butadiene, acrylonitrile, isoprene and isobutylene. PSAs are also well known in the art and any of the known adhesives can be used with the facestocks of the present invention. In one preferred embodiment, the PSAs are based on copolymers of acrylic acid esters, such as, for example, 2-ethyl hexyl acrylate, with polar comonomers such as acrylic acid.

As noted above, the properties of the films and facestocks described above can be improved in some instances, by laminating a film layer over the polypropylene film of the invention. The overlaminate layer can provide additional properties such stiffness and weatherability to the adhesive construction. The overlaminate layer can also provide a transparent coating or film over printed indicia to protect the print from damage caused by physical contact with adjacent objects, and damage caused by exposure to moisture, water, or weather. The transparent coating can also enhance the optical quantities of the underlying printed indicia to provide a glossier and richer image. The overlaminated constructions of this invention are uniquely suited for use as labels on substrates subjected to subsequent liquid processing such as bottle washing/rinsing, filling and pasteurization, or liquid immersion (e.g., ice bath) without displaying adverse consequences such as label lifting or hazing.

The overlaminated film layer can be laminated to the polypropylene film of the invention by pressure when in the form of a continuous film having a layer of adhesive material interposed between the continuous polymer film of the adhesive structure and the overlaminate film layers. The overlaminated film layer can be laminated to the polypropylene film by heat and pressure when either the polypropylene film or the overlaminate film is formed from a material that when heat activated forms its own adhesive surface for lamination. Printing indicia can be disposed on the polypropylene film surface and/or on a backside surface of the overlaminate film layer.

Figure 5:
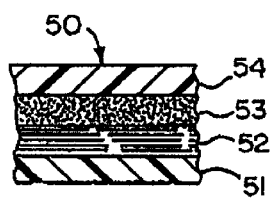
FIG. 5 is a schematic illustration of a cross sectioned side elevational view of an overlaminated construction embodying one embodiment of the present invention.

FIG. 5 illustrates a first embodiment of an overlaminated construction 50 prepared in accordance with the principles of this invention. The overlaminated construction 50 comprises the polypropylene film 51, printing indicia or other form of marking 52 disposed on the polypropylene film layer 51, a second adhesive layer 53 disposed over the printing indicia or marking 52, and an overlaminate film layer 54 disposed over the second adhesive layer 53. The second adhesive layer 53 can be formed from the same types of pressure sensitive adhesive materials discussed above. The thickness of the second adhesive layer generally will be in the range of from about 1 to about 50 microns (from about 0.02 to about 2 mils) and preferably in the range of from about 2 to about 20 microns (0.08 to about 0.8 mils). FIG. 5 also can illustrate another embodiment of the invention described above wherein a polypropylene film of the invention 54 is laminated to another film 51 having printing indicia or markings 52 thereon by use of an adhesive 53.

Figure 6:
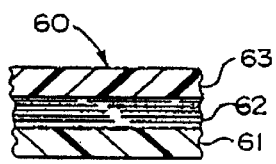
FIG. 6 is a schematic illustration of a cross sectioned side elevational view of another overlaminated construction embodying one embodiment of the present invention.

FIG. 6 is a cross-sectional side view of another overlaminated adhesive structure 60 of the present invention. This overlaminated structure 60 comprises the polypropylene film layer 61 described above, a layer of printing indicia 62, and the overlaminate layer 63. In this embodiment, either the polymeric film layer 61 or the overlaminate film layer 63, or both, are formed from a material that is heat activatable to provide its own adhesive surface for lamination. The material should have a sufficient "open tack" time to facilitate lamination at a relatively low temperature so as to avoid unwanted heat effects in the adhesive constructions.

It is to be understood that the overlaminated adhesive constructions of the present invention can be configured differently depending on the particular finished label application. For example, in FIG. 5, the printed indicia can be interposed between the second adhesive layer 53 and the overlaminate film layer 54 (e.g., a reversed printed overlaminate film layer). Such a construction generally can be prepared by using a laminated film 54 that is first reversed printed and subsequently has a layer of pressure sensitive adhesive applied to the reverse-printed surface. The film then is laminated to the film layer 51 via the PSA layer by conventional pressure lamination techniques.

Figure 7A:
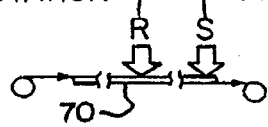
FIG. 7A is a schematic illustration showing the application of a release coating and an adhesive to a liner or carrier stock.
Figure 7B:
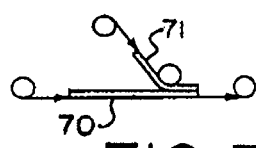
FIG. 7B is a schematic illustration showing the joining of the liner or carrier stock from FIG. 7A to a facestock.

In the manufacture of labelstock using the above-described monolayer and multilayer films as facestocks in accordance with the invention (FIGS. 7A–7D), liner or carrier stock may be provided. The liner or carrier stock 70 may comprise a multilayer liner made for example as disclosed in U.S. Pat. No. 4,713,273, the disclosure of which is incorporated herein by reference, or may be conventional liner or carrier consisting of a single paper or film layer which may be supplied in roll form. If it has not been previously provided with a release coating and does not itself include components to inherently generate a release surface at its adhesive-contacting face, the liner or carrier 70 may be coated with a release coating at station R, as shown in FIG. 7A. If a release coating is applied, it is dried or cured following application by any suitable means (not shown). If the liner or carrier 70 comprises a plastic extrudate, then prior to application of the release coating at station R, the formed films may be hot-stretched to provide orientation of the liner or carrier 70.

The release face of the release liner or carrier may be coated with a layer of pressure-sensitive adhesive for subsequent transfer of the adhesive to the facestock with which the liner or carrier is employed. When the facestock is combined with the liner or carrier, the adhesive is joined to the facestock. Later, the liner or carrier is removed to expose the adhesive, which now remains permanently joined to the facestock.

Thus, as indicated in FIG. 7A, adhesive may be applied at station S following drying or cure of the release coat previously applied at station R. This may be a tandem coating operation, or the adhesive coating may be on a separate coating line. Alternatively, the adhesive may be applied at some later time prior to the joining of the release liner or carrier 70 with the facestock 71. The joining of the liner or carrier with a facestock 71 is diagrammatically illustrated in FIG. 7B. Alternatively, the adhesive may be coated directly on the facestock 71 prior to the combining of the facestock and liner or carrier.

In some applications, the adhesive may be a heat-activated adhesive or a hot-melt adhesive such as used in in-mold label applications, as distinguished from a pressure-sensitive adhesive, in which case there may be no need for the provision of a release liner or inherent releasability such as is required when using a pressure-sensitive adhesive.

The label facestock may be printed at a printing station (not shown) prior to being die-cut into individual labels. The printing step may occur before or after the combining of liner and facestock, but will precede the die-cutting of the facestock into individual labels. The film must remain in accurate register between printing steps (for example, between successive impressions in different colors) in order that image or text be of high quality, and between printing and subsequent die-cutting in order that image or text be located properly on the labels. The film is under tension during printing, and may be subjected to some increase in temperature, as for example when UV inks are cured, and must not stretch significantly in the machine-direction. The MD tensile properties of the facestock film are particularly important when a polymeric film liner is used or when no liner is required.

Figure 7C:
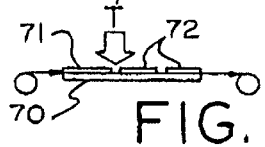
FIG. 7C is a schematic illustration showing die-cutting of the facestock from FIG. 7B to make a series of spaced pressure-sensitive labels carried by the liner or carrier stock.
Figure 7D:
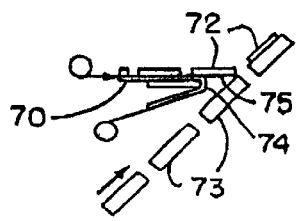
FIG. 7D is a schematic illustration showing the application of the labels from FIG. 7C to passing work pieces.

FIG. 7C diagrammatically illustrates the die-cutting of the facestock 71, at a station T, into a series of spaced pressure-sensitive labels 72 carried by the release liner or carrier 70. This step may be performed by, for example, rotary or flat bed metal cutting dies in a well-known manner and involves the stripping of the ladder-shaped matrix (not shown) of waste or trim surrounding the formed labels after they are die cut (the "rungs" of the ladder representing the spacing between successive labels). The labels then remain on the liner in spaced relation with each other, as shown. One failure mode in this operation involves poorly die-cut labels remaining with the matrix as it is stripped. In this mode, as release levels decrease, poor die-cutting is more likely to caused labels to stay attached to the matrix material and be removed from the liner during matrix stripping. FIG. 7D illustrates the application of the labels 72 to passing workpieces 73 by use of a peel-back edge 74 to dispense the labels 72 by progressively removing the liner or carrier from them to thereby expose the adhesive side 75 of the labels and project the labels into contact with passing workpieces 73.

The workpieces 73 may constitute rigid substrates such as glass bottles or other rigid articles tending to have irregularities in the surface and therefore requiring labels that are flexible and closely adhere (conform) to the surface without bridging local surface depressions. Alternatively, the workpieces may be soft, flexible substrates such as plastic containers requiring labels which flex when the container is flexed.

It will be understood that the operations shown in FIGS. 7A to 7D may be done at different locations by different manufacturers, or they may be combined. For example, the steps of FIG. 7A may be performed by a liner and adhesive manufacturer, the steps of FIGS. 7B and 7C may be performed by a label manufacturer on one continuous pass rather than being interrupted by a wind/unwind sequence as illustrated, and the steps of FIG. 7D may be performed by a package of manufactured products.

Facestock which is formed into labels is usually wound and unwound in roll form, and is therefore one form of what is known as "roll stock" or "roll facestock," and the accompanying liner or carrier is called "roll liner." It has been discovered that the monolayer facestocks of this invention as described above are non-blocking and can be readily wound and unwound as needed.

The following examples illustrate the preparation of the films of the invention. The apparatus used to prepare the films is a coextrusion line with three extruders and a five-layer feedblock capable of producing films of up to five layers. The apparatus contains a 10" wide die. When monolayer films are prepared, only one extruder (a 30 mm extruder with an L/D of 25) is used, and the other two inlets of the feedblock are closed. A dry blend of the polypropylene homopolymer or copolymer and the alkylene alkyl acrylate is prepared by tumbling the mixture for about 30 minutes, and this dry blend is fed to the extruder via a hopper. After the film has been cast, it is stretched on a machine direction orientation unit. The extruder used in the following examples has six heated zones which are maintained at 180° C., 195° C., 208° C., 218° C., 218° C., and 218° C. The feedblock is heated to 218° C., and the temperature of the die is maintained at 218° C. The extruder is operated at 116 rpm and requires 1.2 KW. After coextrusion casting, the film is stretched in the machine direction at the stretch ratios listed in the following examples. The stretch unit is maintained at about 115° C., and the annealing unit is maintained at about 105° C. The details of the preparation of monolayer films of the invention, and the L+W stiffness of the films as measured are summarized in the following Table III.

TABLE III

Monolayer Films

| Film Example | Composition No. (Table IIA) | MDO Ratio | Thickness (microns) | L + W Stiffness (mN) MD | CD |
|---|---|---|---|---|---|
| A | 1 | 1:1 | 77 | 19 | 17 |
| B | 1 | 7.1:1 | 83 | 113 | 39 |
| C | 1 | 7:1 | 80 | 98 | 25 |
| D | 2 | 1:1 | 79 | 17 | 16 |
| E | 2 | 6:1 | 94 | 86 | 27 |
| F | 2 | 8:1 | 93 | 120 | 31 |
| G | 2 | 8.3:1 | 87 | 119 | 24 |
| H | 2 | 9.6:1 | 90 | 123 | 23 |
| I | 2 | 10:1 | 83 | 123 | 21 |
| J | 3 | 1:1 | 80 | 42 | 36 |
| K | 3 | 5.2:1 | 80 | 100 | 35 |
| L | 3 | 5.5:1 | 83 | 102 | 32 |
| M | 3 | 7.1:1 | 83 | 71 | 25 |
| N | 3 | 7.3:1 | 85 | 105 | 31 |
| O | 3 | 7.3:1 | 71 | 54 | 18 |
| P | 3 | 8.5:1 | 80 | 137 | 33 |
| Q | 3 | 8.6:1 | 81 | 162 | 35 |
| R | 4 | 8:1[a] | 79 | 71 | 61 |
| S | 4 | 8:1[b] | 78 | 69 | 14 |
| T | 4 | 8:1[c] | 87 | 89 | 18 |
| U | 5 | 6.1:1 | 159 | 610 | 200 |
| V | 5 | 6.1:1 | 161 | 598 | 204 |
| W | 5 | 8:1 | 50 | 26 | 4 |
| X | 5 | 8.1:1 | 133 | 444 | 121 |
| Y | 5 | 8.2:1 | 114 | 323 | 84 |
| Z | 6 | 6:1 | 84 | 77 | 26 |
| AA | 6 | 7.6:1 | 79 | 94 | 25 |
| AB | 6 | 9.2:1 | 83 | 145 | 30 |
| AC | 6 | 8.4:1 | 66 | 63 | 14 |
| AD | 7 | 6.3:1 | 111 | 296 | 126 |
| AE | 7 | 8.4:1 | 69 | 79 | 20 |

TABLE III-continued

Monolayer Films

| Film Example | Composition No. (Table IIA) | MDO Ratio | Thickness (microns) | L + W Stiffness (mN) MD | CD |
|---|---|---|---|---|---|
| AF | 8 | 7.1:1 | 84 | 59 | 18 |
| AG | 9 | 7.2:1 | 81 | 89 | 30 |
| AH | 10 | 7.1:1 | 77 | 46 | 12 |
| AI | 11 | 7:1 | 84 | 84 | 39 |
| AJ | 11 | 7.3:1 | 69 | 55 | 19 |
| AK | 9 | 7.3:1 | 72 | 74 | 28 |
| AL | 12 | 7.3:1 | 72 | 64 | 18 |
| AM | 13 | 6.2:1 | 74 | 72 | 29 |
| AN | 13 | 8:1 | 56 | 50 | 15 |

[a]annealed at 80° C.
[b]annealed at 90° C.
[c]annealed at 130° C.

The following examples illustrate the preparation of additional films and the properties of the films thus obtained. The procedure described above with respect to examples A through AN is followed except that the extruder is operated at an average of 110 rpm, temperature of 230° C., pressure 30 bar, and power 1.1 kw. The cast roll temperatures, MDO temperatures, stretch ratio and production speed are as set forth in the following Table IV.

TABLE IV

Extruded Monolayer Films

| Film Example | Composition No. (Table IIA) | Cast Roll Temp (° C.) | MDO* Temps (° C.) | Stretch Ratio | Production Speed (Meter) min |
|---|---|---|---|---|---|
| AO | 15 | 85 | 95/125/115 | 6.9:1 | 11.7 |
| AP | 16 | 85 | 95/125/115 | 6.9:1 | 11.7 |
| AQ | 17 | 35 | 75/85/80 | 6.9:1 | 11.7 |
| AR | 18 | 35 | 35/60/50 | 5.7:1 | 9.1 |
| AS | 20 | 30 | 88/135/128 | 7.3:1 | 11.6 |

*Preheat/stretch/anneal

The temperatures of the chill roll and the MDO unit are set lower when extruding the blend of 10% PP/90% EBA (AR) because of the lower melting point of the EBA. These temperatures are set higher when extruding the blend of 90% PP/10% EBA (AS) because the PP can withstand a higher cooling temperature.

The L+W stiffness (or bending resistance) values also are determined on the films of Example AO to AS as prepared (MDm) and also corrected to a 70 micron film ($MD_{70}$). The correction to 70 microns is determined by the following equation where m is the measured thickness of the film tested.

$$MD_{70} = Md_m \times (70/m)^3$$

This calculation is based on the assumption that the film is homogeneous in the thickness; that is, the modulus of elasticity is the same all over the thickness. The transparency of the films is measured with an Elrepho 2000 Data color using a black and white background. The two results are compared and the transparency is determined. The stiffness and transparency results are summarized in the following Table V.

TABLE V

| Film Example | % PP | Caliper [μm] | L&W Stiffness [mN] MD | L&W Stiffness [mN] CD | L&W Corrected 70 μm MD{70} | L&W Corrected 70 μm CD{70} | Average Transparency |
|---|---|---|---|---|---|---|---|
| AR | 10 | 86 | 18 | 10 | 10 | 5 | 94.98 |
| AQ | 25 | 67 | 19 | 4 | 22 | 5 | 94.51 |
| AO | 50 | 72 | 44 | 7 | 40 | 6 | 93.79 |
| AP | 75 | 67 | 67 | 16 | 76 | 18 | 94.06 |
| AS | 90 | 75 | 97 | 38 | 79 | 31 | 94.76 |

These results indicate that, for these films, the bending resistance in the machine direction increases with an increase in polypropylene content. In the cross direction, the bending resistance is low until the polypropylene content is 50%, and then the bending resistance increases with an increase in polypropylene content. The transparency of the clear films is high but somewhat less when the polypropylene content is around 50%. The differences are, however, rather small.

The maximum force required to stretch some of the films (Fmax), and the tensile strength, elongation at break, yield point and elastic modulus of the films are determined with a Zwick Tester (ASTM Test D882 entitled "Tensile Properties of Thin Plastic Sheeting"). The results are summarized in the following Table VI.

TABLE VI

| | | Tensile Properties | | | | | | | | | |
|---|---|---|---|---|---|---|---|---|---|---|---|
| Film | | F(max) [N] | | Tensile Strength [kN/m] | | Elong [%] | | Yield Point [N] | | E-modulus [N/mm$^2$] | |
| Example | % PP | MD | CD | MD | CD | MD | CD | MD | CD | MD | CD |
| AQ | 25 | 183 | 14.3 | 6.37 | 0.51 | 47.5 | 451 | 0.0 | 17.2 | 780 | 352 |
| AO | 50 | 272 | 33.3 | 7.18 | 1.22 | 24.3 | 634 | 0.0 | 23.3 | 1866 | 427 |
| AP | 75 | 222 | 41.6 | 3.90 | 1.36 | 27.9 | 570 | 279 | 40.9 | 2553 | 867 |
| AS | 90 | 277 | 54.1 | 8.46 | 2.16 | 28.1 | 8 | 280 | 53.9 | 2736 | 966 |

The results shown in Table VI indicate that, for these films the maximum force needed to stretch the films in the MD and in the CD is higher when there is 50% w or more of PP in the blend; in the MD, elongation increases with PP content, and in the CD, the film with 90% PP did not stretch but snapped; yield for 25% and 50% PP in the MD is zero, and the yield in the CD increases with PP content; and the modulus in the MD and CD increases with increased PP content.

One important advantage of the monolayer and multilayer film facestocks described above and used in the die-cut labels of the invention is the improved die-cuttability of the labels. It has been observed, for example, that die-cutting of the labels of the present invention provides sharp and distinct cuts with full separation of the label from the matrix along the cut label edge being achieved at a lower die-cutting pressure, and the cutting tool does not have to be as sharp when cutting the facestock label films of the present invention. Failure to achieve a clean die-cut perimeter between the label and surrounding matrix can cause the matrix to break, in either the machine or cross directions, and remain with the label on the release liner. This defect will adversely affect the dispensing operation by applying a double label or label plus matrix strip(s) to the substrate.

The die-cuttability of the films prepared from the propylene compositions of the examples is evaluated by die-cutting shapes in the films and thereafter measuring the frictional energy required to separate the matrix from the die-cut shape. As described below, the frictional energy is calculated by measuring the force required to separate the die cut shape from its matrix, during the displacement of the test sample. A low frictional energy value (e.g., about 150 g-cm or less) indicates the laminate exhibits good die-cuttability. This test which is conducted as follows is described in more detail in U.S. Pat. No. 5,961,766 which is hereby incorporated by reference.

A test sheet of each film having the dimensions of 7×10" (17.8×25.4 cm) is advanced through a die-cutter where 10 labels are cut in the facestock. The die-cutter has a cylindrical profile. The die-cutting roll has a diameter of 3 inches (76.2 mm), with one cavity across and 10 cavities around. Each of the cavities are 6 inches (152.4 mm) long (or across), 1 5/16 inch (22.25 mm) wide (or deep) and have rounded corners with diameters of 3/32 inch (2.38 mm). The separation between adjacent cavities is 1/8 inch (3.175 mm). The anvil roll has a diameter of 5 inches (127 mm). The gap between the anvil and the tip of the die is 2.2 mils (0.0559 mm). The die pressure is 300 psi (0.2 Mpa), and the speed of the die is 15 m/min.

The die-cut in each test sheet is deep enough to penetrate the film. The labels that are formed are rectangular in shape and arranged side-by-side on the test sheet, one label across and ten deep. The long dimension of each label is parallel to the long dimension of the next adjacent label. The labels have the dimensions of 7/8×6" (22.25 mm×152.4 mm) and are equidistant from each other. The gap between each label is 1/8 inch (3.175 mm). A matrix, which consists of the portion of the waste facestock around the labels, is also formed during the die-cutting.

A test sample is formed by cutting the die-cut test sheet along the center line of the long dimension of one label and then along the center line of the long dimension of the next adjacent label. The cuts are parallel to each other. Each test sample consists of one-half of one label, one-half of the next adjacent label sample, and the matrix around the label portions.

The friction energy required to separate the matrix from the die-cut labels of each sample is measured using a modified TA-XT2 Texture Analyzer provided by Stable Micro Systems, Unit 105, Blackdown Rural Industries, Haste Hill, Haslemere, Surrey GU 27 3AY, England. The TA-XT2 Texture Analyzer is a tensile testing device. It is modified as follows: the fixture on the top crosshead is removed and substituted by an upper L-shaped bracket; one arm of the upper L-shaped bracket is attached to the upper frame; the platform mounted on the base is removed and substituted by a lower L-shaped bracket. Each test sample is tested by attaching an edge of the matrix of the test sample to the upper L-shaped bracket, and attaching the edge of each label portion adjacent to the attached matrix edge to the lower L-shaped bracket. The texture analyzer is activated and the matrix is separated from the label portions at a rate of 5 mm/s.

The force used to separate the matrix, and the displacement of this force along the length of the test sample during separating is plotted using software provided with the TA-XT2 Texture Analyzer. The area under the plot is also determined using software provided with the TA-XT2 Texture Analyzer. The area under the plot has the units of gram-seconds. The result is multiplied by the stripping speed (5 mm/s) and after making appropriate corrections for units (i.e., mm to cm), the friction energy results are provided in terms of gram-centimeters (g-cm). Higher friction energy numbers are associated with poorly cut facestocks or adhesive flowback. The test results for films of the invention also are summarized in Table VII. For each film, 20 test samples are tested and the averages for these test samples are given in Table VII. The friction energy of two control films also is determined. Control film 1 is a film of 100% Stamylan 17M10 which is not machine direction oriented and has a thickness of 79 microns. Control film 2 is a film of 100% Stamylan 17M10 which is MDO at a stretch ratio of 7.4:1 and has a thickness of 76. A reading of zero (0) indicates a clean cut label completely free from the matrix after die cutting.

TABLE VII

| Film Example | Average Friction Energy (g-cm) |
|---|---|
| Control - 1 | 1373 |
| Control 2 | 0 |
| A | 542 |
| B | 93 |
| C | 56 |
| D | 360 |
| E | 72 |
| F | 72 |
| G | 56 |
| H | 25 |
| I | 75 |
| J | 592 |
| K | 139 |
| L | 64 |
| M | 75 |
| N | 72 |
| O | 108 |
| P | 112 |
| Q | 84 |
| R | 87 |
| S | 90 |
| T | 54 |
| U | NA |
| V | NA |
| W | 122 |
| X | NA |
| Y | NA |
| Z | 126 |
| AA | 86 |
| AB | 84 |
| AC | 150 |
| AD | NA |
| AE | NA |
| AF | 68 |
| AG | 385 |
| AH | 92 |
| AI | 217 |
| AJ | 155 |
| AK | 173 |
| AL | 96 |
| AM | 144 |
| AN | 194 |
| AO | 73* |

TABLE VII-continued

| Film Example | Average Friction Energy (g-cm) |
|---|---|
| AP | 73* |
| AQ | 164* |
| AR | 330 |
| AS | 130* |

*Average of two series, each series consisting of ten samples

In one embodiment films prepared from a mixture of polypropylene and an alkylene-alkyl acrylate such as ethylene butyl acrylate (EBA) wherein the mixture contains about 60% polypropylene and the MD stretch ratio is about 6:1 exhibit excellent frictional energy (lowest). The PP/EBA ratio is responsible for good printability and die cuttability, and the stretch ratio is responsible for good die cuttability and good balance between MD and CD stiffness.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:
1. A film comprising a mixture of:
(A) a propylene homopolymer or copolymer having a melt flow rate of from about 6 to about 14, and
(B) an alkylene-alkyl acrylate or methacrylate copolymer, wherein the film has been oriented by hot stretching in the machine direction and annealing the stretched film, and the L+W stiffness of the film in the cross-direction is less than 0.75 times the stiffness in the machine direction.
2. The film of claim 1 wherein (A) is a propylene homopolymer.
3. The film of claim 2 wherein the melt flow rate of the propylene homopolymer is at least about 8.
4. The film of claim 1 wherein the alkylene of (B) is an α-olefin containing from 2 to about 8 carbon atoms.
5. The film of claim 1 wherein the alkylene is ethylene.
6. The film of claim 1 wherein the alkyl acrylate of (B) is a $C_1$ to $C_8$ alkyl acrylate or methacrylate.
7. The film of claim 1 wherein the alkyl acrylate of (B) is a $C_1$ to $C_8$ alkyl acrylate.
8. The film of claim 1 wherein the acrylate is n-butyl acrylate.
9. The film of claim 1 wherein (B) is an ethylene butyl acrylate copolymer.
10. The film of claim 1 comprising from about 40% to about 90% by weight of (A) and from about 10% to about 60% by weight of (B).
11. The film of claim 1 wherein the film has been oriented in the machine direction at a stretch ratio of at least 2:1.
12. The film of claim 1 wherein the film has been oriented in the machine direction at a stretch ratio of from about 2:1 to about 9:1.
13. The film of claim 1 having a thickness of from about 2 to about 4 mils.
14. The film of claim 1 which is a monolayer film.
15. The film of claim 1 formed by cast extrusion.
16. The film of claim 1 also containing at least one pigment.
17. The film of claim 16 wherein the pigment is dispersed in the propylene polymer or copolymer (A), or in another polyolefin-based material with a lower melting point than (A).

18. The film of claim 1 comprising from about 50% to about 80% by weight of (A) and from about 20% to about 50% by weight of B.

19. A machine-direction oriented monolayer film facestock for labels comprising a mixture of (A) from about 40% to about 90% by weight of a propylene polymer or copolymer having a melt flow rate from about 6 to about 14, and (B) from about 10% to about 60% by weight of an ethylene-alkyl acrylate copolymer wherein the alkyl group contains from 1 to about 8 carbon atoms, the L+W stiffness of the film in the cross-direction is less than 0.75 times the stiffness in the machine direction, and the film has been oriented by hot stretching the film in the machine direction followed by annealing of the hot-stretched film.

20. The facestock of claim 19 wherein (A) is a propylene homopolymer.

21. The facestock of claim 19 wherein the melt index of the ethylene acrylate copolymer (B) is from about 3 to about 10.

22. The facestock of claim 19 having a thickness of from 2 to about 4 mils.

23. The facestock of claim 19 oriented in the machine direction at a stretch ratio of at least about 2:1.

24. The facestock of claim 19 oriented in the machine direction at a stretch ratio of from about 2:1 to about 9:1.

25. The film of claim 19 comprising from about 50% to about 80% by weight of (A) and from about 20% to about 50% by weight of B.

26. A film comprising a mixture of:

(A) a propylene homopolymer or copolymer, and (B) an alkylene-n-butyl acrylate copolymer wherein the film has been oriented by hot stretching in the machine direction and annealing the stretched film, and the L+W stiffness of the film in the cross direction is less than 0.75 times the stiffness in the machine direction.

27. The film of claim 26 wherein (A) is a propylene homopolymer.

28. The film of claim 26 wherein the alkylene of (B) is a alpha-olefin containing from 2 to about 8 carbon atoms.

29. The film of claim 26 wherein the alkylene of (B) is ethylene.

30. The film of claim 26 comprising from about 40% to about 90% by weight of (A) and from about 10% to about 60% by weight of (B).

31. The film of claim 26 having a thickness of from about 2 to about 4 mils.

32. The film of claim 26 which is a monolayer film.

33. The film of claim 26 comprising from about 50% to 80% by weight of (A) and from about 20% to about 50% by weight of (B).

\* \* \* \* \*